(12) United States Patent
Choi et al.

(10) Patent No.: US 11,176,678 B2
(45) Date of Patent: Nov. 16, 2021

(54) METHOD AND APPARATUS FOR APPLYING DYNAMIC EFFECT TO IMAGE

(71) Applicant: Snow Corporation, Seongnam-si (KR)

(72) Inventors: Sangho Choi, Seongnam-si (KR);
Byung-Sun Park, Seongnam-si (KR);
Junghwan Jin, Seongnam-si (KR);
Wonhyo Yi, Seongnam-si (KR);
Hyeongbae Shin, Seongnam-si (KR);
Seongyeop Jeong, Seongnam-si (KR);
Sungwook Kim, Seongnam-si (KR);
Noah Hahm, Seongnam-si (KR); Jimin Kim, Seongnam-si (KR)

(73) Assignee: SNOW CORPORATION, Gyeonggi-do (KR)

( * ) Notice: Subject to any disclaimer, the term of this patent is extended or adjusted under 35 U.S.C. 154(b) by 139 days.

(21) Appl. No.: 16/585,562

(22) Filed: Sep. 27, 2019

(65) Prior Publication Data
US 2020/0058128 A1 Feb. 20, 2020

Related U.S. Application Data

(63) Continuation of application No. PCT/KR2017/003466, filed on Mar. 30, 2017.

(51) Int. Cl.
*G06T 7/194* (2017.01)
*G06T 7/55* (2017.01)
(Continued)

(52) U.S. Cl.
CPC .............. *G06T 7/194* (2017.01); *G06T 5/008* (2013.01); *G06T 5/50* (2013.01); *G06T 7/55* (2017.01);
(Continued)

(58) Field of Classification Search
CPC .. G06T 7/194; G06T 7/55; G06T 7/74; G06T 5/008; G06T 5/50; G06T 11/001;
(Continued)

(56) References Cited

U.S. PATENT DOCUMENTS 8,922,553 B1* 12/2014 Tena ....................... G06T 13/00
345/423
2012/0201417 A1 8/2012 Park et al.
(Continued)

FOREIGN PATENT DOCUMENTS

JP 2013-55489 A 3/2013
JP 2014-16670 A 1/2014
(Continued)

OTHER PUBLICATIONS

Korean Office Action dated Nov. 26, 2020 issued in corresponding Korean Patent Application No. 10-2019-7030223.
(Continued)

*Primary Examiner* — Phuoc Tran
(74) *Attorney, Agent, or Firm* — Harness, Dickey & Pierce, P.L.C.

(57) ABSTRACT

An image processing method including acquiring depth information on at least one of a first portion of a specific object included in a target image or a second portion in a region of the target image that excludes the specific object based on reference pattern information, the reference pattern information including first information on a shape of an object included in an image and second information on a relative position between at least two objects included in the image, and applying a dynamic effect to at least one of the first portion or the second portion based on the acquired depth information may be provided.

19 Claims, 8 Drawing Sheets

(51) Int. Cl.
  *G06T 7/73* (2017.01)
  *G06T 5/00* (2006.01)
  *G06T 5/50* (2006.01)
  *G06T 11/00* (2006.01)
(52) U.S. Cl.
  CPC .............. *G06T 7/74* (2017.01); *G06T 11/001* (2013.01); *G06T 2207/30201* (2013.01)
(58) Field of Classification Search
  CPC ........... G06T 2207/30201; G06T 13/80; G06T 11/00; G06K 9/00201; G06K 9/00302
  See application file for complete search history.

(56) References Cited

U.S. PATENT DOCUMENTS

| | | | |
|---|---|---|---|
| 2013/0225305 A1* | 8/2013 | Yang | A63F 13/53 473/152 |
| 2015/0117777 A1 | 4/2015 | Hsun | |
| 2015/0254892 A1 | 9/2015 | Smith et al. | |
| 2016/0225167 A1 | 8/2016 | Kameyama | |
| 2016/0366396 A1* | 12/2016 | Kim | G06T 7/277 |

FOREIGN PATENT DOCUMENTS

| | | |
|---|---|---|
| JP | 2017-26914 A | 2/2017 |
| KR | 10-1075720 B1 | 10/2011 |
| KR | 10-2012-0049218 A | 5/2012 |
| KR | 101513999 B1 | 4/2015 |
| WO | WO-2014/155877 A1 | 10/2014 |

OTHER PUBLICATIONS

International Search Report PCT/ISA/210 for International Application No. PCT/KR2017/003466 filed Mar. 30, 2017.

Japanese Office Action dated Nov. 4, 2020 issued in corresponding Japanese Application No. 2019-551550.

* cited by examiner

METHOD AND APPARATUS FOR APPLYING DYNAMIC EFFECT TO IMAGE

CROSS-REFERENCE TO RELATED APPLICATIONS

This U.S. non-provisional application is a continuation application of, and claims the benefit of priority under 35 U.S.C. § 365(c) from International Application PCT/KR2017/003466, which has an International filing date of Mar. 30, 2017 and designated the U.S., the entire contents of each of which are incorporated herein by reference in their entirety

BACKGROUND

1. Field

Example embodiments relate to methods and/or apparatuses for applying a dynamic effect to an image, and more particularly, to methods and/or apparatuses for acquiring depth information on at least one portion of an image and applying a dynamic effect (e.g., a motion effect) to the image based on the acquired depth information.

2. Description of the Related Art

An image (picture) may represent only a two-dimensional (2D) thing, and may not represent the same liveliness or sense of presence as it appears in a video. However, the video may use a relatively large storage capacity compared to that of the image, and/or a large amount of time may be spent to produce the video.

There is a method of generating content, for example, an image, recognizable to be similar to a video by capturing a plurality of images and synthesizing the captured plurality of images. However, it is inconvenient to capture the plurality of images, and the capacity for content generated by synthesizing the plurality of images corresponds to the sum of respective storage capacities for the plurality of images. Accordingly, the storage capacity needed for such synthesized result of the plurality of images significantly increases compared to that needed for a single image. Thus, such method is ineffective.

Accordingly, there is a need for an image processing method and apparatus that may represent liveliness or a sense of presence through content generated based on images, instead of using a video, and may generate content without significantly increasing the capacity compared to that of an existing image.

The aforementioned information is merely provided to help understanding, and may include content that does not constitute a portion of the related art, and may not include content that may be offered from the related art to those skilled in the art.

SUMMARY

One example embodiment provides an image processing method that may acquire depth information on a target image based on reference pattern information (or alternatively, predetermined pattern information), which includes information on a shape of an object included in an image and information on a relative position between objects included in the image, and may apply a dynamic effect to the target image based on the acquired depth information.

One example embodiment provides a method that may identify a shadow of a specific object included in a target image or an outline of the specific object, and may acquire, as depth information, a relative position between the specific object included in the target image and another object based on the identified information.

One example embodiment provides a method that may acquire a plurality of pieces of depth information on a target image, and may apply a different dynamic effect to the target image based on the acquired depth information.

According to an example embodiment, an image processing method includes acquiring depth information on at least one of a first portion of a specific object included in a target image or a second portion in a region of the target image that excludes the specific object based on reference pattern information, the reference pattern information including first information on a shape of an object included in an image and second information on a relative position between at least two objects included in the image, and applying a dynamic effect to at least one of the first portion or the second portion based on the acquired depth information.

The acquiring depth information may include acquiring the depth information on each of a plurality of points of the target image, each of the points corresponding to the first portion or the second portion, and the applying a dynamic effect may include applying a different dynamic effect to each of at least two points among the points based on a depth value represented by the depth information acquired for a corresponding one of the at least two points.

The applying a dynamic effect may include applying a first dynamic effect to one of the at least two points that has a first depth value greater than or equal to a threshold value, and applying a second dynamic effect to another of the at least two points that has a second depth value less than the threshold value.

The first dynamic effect and the second dynamic effect each are a motion effect with respect to the specific object or an element included in the specific object, which is associated with the one of the at least two point, and the first dynamic effect may be greater than the second dynamic effect.

The specific object included in the target image may be a background, a first thing constituting the background, or a second thing that does not include the background in the target image.

The depth information represents a relative depth value based on the specific object included in the target image or an element included in the specific object with respect to a specific reference position.

The dynamic effect may include at least one of a motion effect, a color change effect, or a shape change effect with respect to a portion of the target image to which the dynamic effect is applied.

The motion effect may include at least one of a shake effect, a rotate effect, or a tilt effect with respect to the portion of the target image to which the dynamic effect is applied.

The first information may include shape information on a shadow of the specific object included in the target image or information for identifying an outline of the specific object, and the second information comprises depth information on the relative position between the specific object and another object, which are included in the target image, (1) based on at least one of a direction, a shape, or a size of the shadow or (2) based on a relationship between the outline of the specific object and another outline of the another object.

The applying a dynamic effect may include determining the dynamic effect to be applied to at least one of the first portion or the second portion based on reference dynamic effect pattern information, and applying the determined dynamic effect to at least one of the first portion or the second portion.

The applying a dynamic effect may further include determining the reference dynamic effect pattern information based on information on at least one of (1) the specific object included in the target image or (2) the region of the target image that does not include the specific object that are identified based on the first information and second information.

The first information may include information on at least one of the specific object included in the target image or information on a shape of at least one element included in the specific object.

The specific object may be a face of a person, and the at least one element included in the specific object is an eye, a nose, lips, or an ear included in the face.

The applying a dynamic effect may include determining first facial expression pattern information corresponding to the dynamic effect to be applied to the face or the at least one element included in the face, and applying a motion effect to the face or the at least one element included in the face based on the determined first facial expression pattern information.

The applying a dynamic effect may include determining second facial expression pattern information corresponding to the dynamic effect to be applied to a portion of the target image that excludes the face or to an entirety of the target image, and applying a motion effect to the portion of the target image that excludes the face or the entirety of the target image based on the determined second facial expression pattern information.

A non-transitory computer-readable record medium storing a program, when executed by one or more processors, causes the one or more processors to perform the aforementioned method may be provided.

According to an example embodiment, an image processing apparatus includes a memory configured to store computer-readable instructions, and one or more processors configured to execute the computer-readable instructions. The one or more processors may be configured to acquire depth information on at least one of a first portion of a specific object included in a target image or a second portion in a region of the target image that excludes the specific object in based on reference pattern information, the reference pattern information including first information on a shape of an object included in an image and second information on a relative position between at least two objects included in the image, and apply a dynamic effect to at least one of the first portion or the second portion based on the acquired depth information.

The image processing apparatus may further include a first database configured to store the reference pattern information. The one or more processor may be configured to acquire the pattern information from the first database.

The one or more processors may be further configured to determine the dynamic effect to be applied to at least one of the first portion or the second portion based on reference dynamic effect pattern information, and apply the determined dynamic effect to at least one of the first portion or the second portion.

The image processing apparatus may further include a second database configured to store the reference dynamic effect pattern information. The one or more processors may be configured to acquire the reference dynamic effect pattern information from the second database.

According to some example embodiments, it is possible to generate content that is recognized by a user as dynamic content similar to a video, by acquiring depth information on a target image based on reference pattern information and by generating desired content by applying of a dynamic effect to the target image.

According to some example embodiments, it is possible to generate dynamic content of which a sense of presence and/or liveliness is enhanced compared to an existing image by applying a different dynamic effect to a target image based on acquired depth information (e.g., a plurality of pieces of depth information acquired for the target image).

According to some example embodiments, it is possible to easily generate dynamic content of which a sense of presence and/or liveliness is enhanced by acquiring a relative position between a specific object included in a target image and another object based on reference pattern information and by determining a dynamic effect to be applied to the target image based on reference dynamic effect pattern information.

BRIEF DESCRIPTION OF DRAWINGS

Example embodiments will be more clearly understood from the following brief description taken in conjunction with the accompanying drawings. The accompanying drawings represent non-limiting, example embodiments as described herein.

DETAILED DESCRIPTION

Hereinafter, some example embodiments of the inventive concepts are described with reference to the accompanying drawings.

In the following description, with respect to a "target image" that is an application target of a dynamic effect, the same reference numeral 100 is assigned to all of a "target image" to which the dynamic effect is not applied and a "target image" to which the dynamic effect is applied, for clarity of description.

While the term "same" or "identical" is used in description of example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure.

As used herein, the term "and/or" includes any and all combinations of one or more of the associated listed items. Expressions such as "at least one of," when preceding a list of elements, modify the entire list of elements and do not modify the individual elements of the list. Thus, for example, both "at least one of A, B, or C" and "A, B, and/or C" means either A, B, C or any combination thereof.

Figure 1:
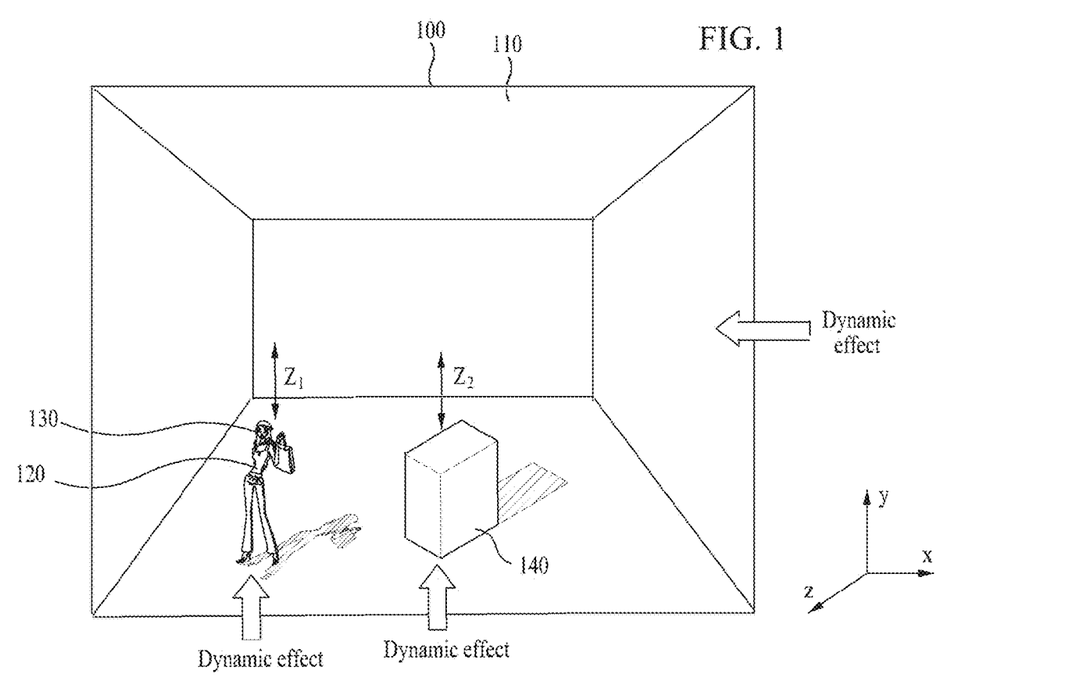
FIG. 1 illustrates a method of acquiring depth information on a target image and applying a dynamic effect to the target image based on the acquired depth information according to an example embodiment.

FIG. 1 illustrates a method of acquiring depth information on a target image and applying a dynamic effect to the target image based on the acquired depth information according to an example embodiment.

FIG. 1 illustrates a method of acquiring depth information on at least one object included in an image and/or at least one element included in the corresponding object, with respect to a target image 100, and applying a dynamic effect to the object and/or the element based on the acquired depth information.

The object included in the target image 100 may indicate a thing or a background included in the image or an element included in the thing or the background. For example, an object included in a target image may be a background, a thing constituting the background, or a thing that does not include the background in the target image. The term "thing" may include any entity, such as a body of a person or a part included in the body, as well as an item. For example, referring to FIG. 1, each of a background 110, a person 120, and a rectangular item 140 may be an object included in the target image 100. For example, a face 130 included in the person 120 may be an object included in the target image 100. The target image 100 may be, for example, a photo captured through a user terminal.

Depth information on an object or an element included in the object may include a relative depth value in a z-axial direction with respect to a specific reference position of the corresponding object or the element included in the object. For example, in FIG. 1, the person 120 included in the target image 100 may have a $z_1$ depth value compared to the background 110 and the item 140 may have a $z_2$ depth value compared to the background 110.

An image processing apparatus, further described with reference to FIGS. 2 to 8, may acquire depth information on at least one of the background 110, the person 120, the face 130, or the item 140 using reference pattern information (or alternatively, predetermined pattern information), and may apply a dynamic effect to at least one of the background 110, the person 120, the face 130, or the item 140 based on the acquired depth information. For example, the image processing apparatus may determine that the background 110 is located at the rearmost location, and the person 120 and the item 140 are located in front of the background 110, based on the reference pattern information in the target image 100. The image processing apparatus may apply a dynamic effect only to the background 110 or may apply a different dynamic effect to each of the person 120 and the item 140, and the background 110.

Reference pattern information used to acquire depth information on the target image 100 may include shape information on a shape of an object included in an image (including information on a shape of an element included in the object) and depth information on a relative position between at least two objects included in the image (including information on a relative position between elements included in the object). The reference pattern information may be stored in a database. The reference pattern information may be predefined.

The dynamic effect applied to the target image 100 may generate at least one of a motion effect, a color change effect (including a shadowing change effect), or a shape change effect with respect to a portion of the applied target image 100.

A cubic effect (or a three-dimensional effect) may be applied to the target image 100 by applying the dynamic effect to the target image 100 based on the acquired depth information on the target image 100, and the user may recognize the target image 100 as dynamic content (or three-dimensionally recognized dynamic content) similar to a video. The cubic effect may refer to an effect, which causes a front positioned object of the target to shake less and a rear positioned object to shake further.

An example embodiment of acquiring depth information on the target image 100 based on the reference pattern information and an example embodiment of applying the dynamic effect to the target image 100 are further described with reference to FIGS. 2 to 8.

Figure 2:
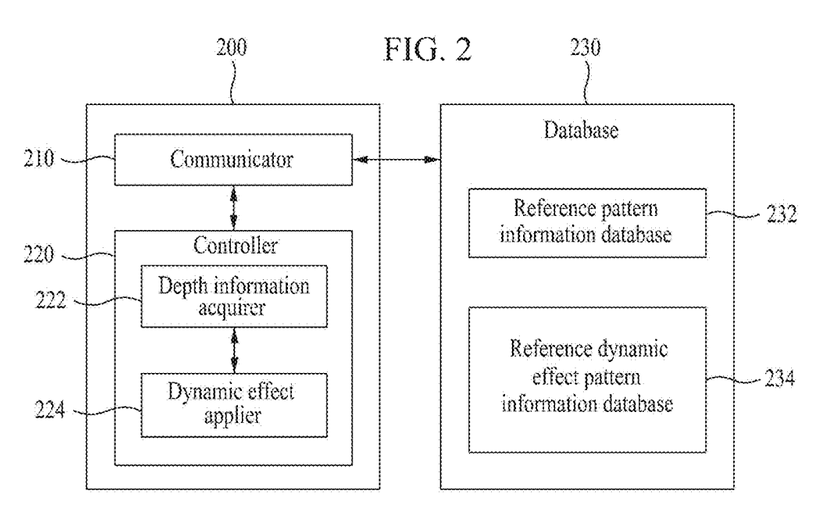
FIG. 2 illustrates an apparatus for applying a dynamic effect to a target image according to an example embodiment.

FIG. 2 illustrates an apparatus for applying a dynamic effect to a target image according to an example embodiment.

An image processing apparatus 200 (hereinafter, referred to as an electronic device 200) configured to acquire depth information on the target image 100 is described with reference to FIG. 2

The electronic device 200 may be a terminal used by a user, such as a personal computer (PC), a notebook (laptop computer), a laptop computer, a tablet, an Internet of things (IoT) device, and a wearable computer, as an apparatus configured to acquire depth information on the target image 100 and to apply a dynamic effect.

In some example embodiments, the electronic device 200 may be a server or other computing devices present at a remote position from a user terminal, as an apparatus configured to acquire depth information on the target image 100 captured or owned by the user or requested by the user and to apply the dynamic effect.

The device 200 may include a communicator 210 and a controller 220.

The communicator 210 may be an apparatus for communication between the electronic device 200 and another server or the user terminal. That is, the communicator 210 may be a hardware module, such as a network interface card, a network interface chip, and a networking interface port of the electronic device 200, or a software module, such as a network device driver or a networking program, configured to transmit/receive data and/or information to/from the other user or the user terminal.

The controller 220 may manage components of the electronic device 200 and may execute a program or an application used by the electronic device 200. For example, the controller 220 may acquire depth information on the target image 100, may execute a program or an application executed to apply the dynamic effect, and may process data received from the other server and the user terminal. Also, the controller 220 may process an operation required to execute the program or the application and to process the data. The controller 220 may be at least one processor of the electronic device 200 or at least one core in the processor.

The controller 220 may include a depth information acquirer 222 configured to acquire depth information on the target image 100 and a dynamic effect applier 224 configured to apply a dynamic effect to the target image 100.

The depth information acquirer 222 may acquire depth information on at least a first portion of an object included in the target image 100 and at least a second portion in a region that does not include the object included in the target image 100 from the target image 100 based on reference pattern information. The reference pattern information may include first information on a shape of an object included in an image and second information on a relative position between at least two objects included in the image.

In some example embodiments, the reference pattern information may be information stored or pre-stored in a storage or a database (not shown) of the electronic device 200, or may be acquired from an external server or database of the electronic device 200.

For example, the electronic device 200 may include a reference pattern information database 232 configured to store the reference pattern information. The depth information acquirer 222 may acquire the reference pattern information from the reference pattern information database 232.

The dynamic effect applier 224 may apply the dynamic effect to at least one of the first portion or the second portion based on the acquired depth information. The dynamic effect applier 224 may determine a dynamic effect to be applied to at least one of the first portion or the second portion based on reference dynamic effect pattern information (or alternatively, predetermined dynamic effect pattern) information and may apply the determined dynamic effect to at least one of the first portion or the second portion.

In some example embodiments, the reference dynamic effect pattern information may be information stored or pre-stored in a storage or a database (not shown) of the electronic device 200, or may be acquired from an external server or database of the electronic device 200.

For example, the electronic device 200 may include a reference dynamic effect pattern information database 234 configured to store the reference dynamic effect pattern information. The dynamic effect applier 224 may acquire the reference dynamic effect pattern information from the reference dynamic effect pattern information database 234.

Each of the reference pattern information database 232 and the reference dynamic effect pattern information database 234 may be included in a different apparatus or server, or may be configured as a single database 230.

Functions and operations of the components 222 and 224 of the controller 220 are further described with reference to FIGS. 3 to 8. The aforementioned components 222 and 224 (as well as the communicator 210) of the controller 220 may be configured in at least one processor. The functions and operations of the components 222 and 224 may be executed by at least one processor. However, the controller 220 is not intended to be limited to the disclosed functional units. In some example embodiments, additional functional units may be included in the controller 220. Further, the controller 220 may perform the operations and/or functions of the various functional units without sub-dividing the operations and/or functions of the various functional units into these various functional units.

In some example embodiments, the communicator 210, the depth information acquirer 222, and the dynamic effect applier 224 may be configured in at least one processor. The communicator 210, the depth information acquirer 222, and the dynamic effect applier 224 may be functional units included in the at least one processor.

Although not illustrated, the electronic device 200 may further include a display configured to output data that is input from the user or to display the target image 100 to which the dynamic effect is applied or not applied. For example, the display may be a touchscreen. In this case, the display may be configured to include a function of an inputter configured to receive a setting and a request from the user.

Description related to technical features described above with reference to FIG. 1 may apply to FIG. 2 and further description is omitted.

Figure 3:
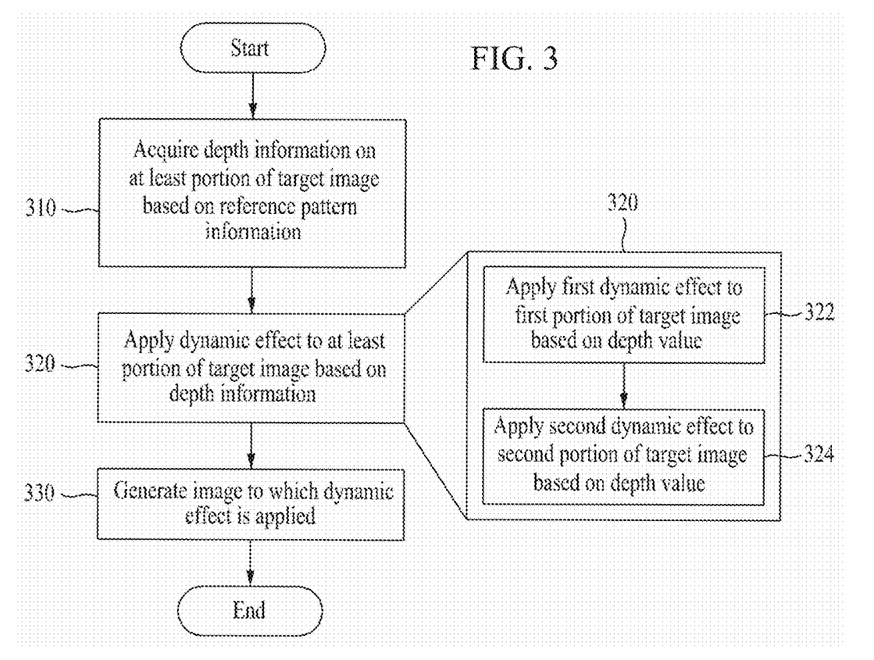
FIG. 3 is a flowchart illustrating a method of acquiring depth information on a target image and applying a dynamic effect to the target image based on the acquired depth information according to an example embodiment.

FIG. 3 is a flowchart illustrating a method of acquiring depth information on a target image and applying a dynamic effect to the target image based on the acquired depth information according to an example embodiment.

A depth information acquirement method and a dynamic effect application method for the target image 100 performed by the electronic device 200 are further described with reference to FIG. 3.

Referring to FIG. 3, in operation 310, the depth information acquirer 222 may acquire depth information on at least a portion of the target image 100 based on reference pattern information. That is, the depth information acquirer 222 may acquire depth information on at least a first portion of an object included in the target image 100 and at least a second portion in a region of the target image 100 that excludes the object from the target image 100, based on the reference pattern information.

The reference pattern information may include first information on a shape of an object included in an image and second information on a relative position between at least two objects included in the image.

The first information may include information used to identify an object included in the target image 100 and/or an element included in the object. For example, the first information may include information on a shape of a specific thing (including a part of a body) corresponding to the object or the element included in the object. The second information may include information used to determine, for example, a relative position between objects included in the target image 100, a relative position between elements included in an object, and a relative position between an element included in one object and another object. The relative position may be information indicating whether a specific object (or element) is in front of or behind, or substantially in line with another object (or element). The relative position may be acquired based on depth values (e.g., by comparing depth values). For example, the second information may include information on a known relative position between corresponding things (parts) in a relationship between specific things (parts of a body).

The depth information acquired based on the reference pattern information may represent a depth value that is acquired based on an object included in the target image 100 or a single element included in the object included in the target image 100. The depth value may be a relative value. For example, the depth value may be a value having a level of precision capable of determining whether an object (or element) is in front of or behind, or substantially in line with another object (or element). For example, the depth information may not include information on a difference between precise depth values of objects (or elements) included in the target image 100.

For example, the depth information acquirer 222 may recognize the background 110 (e.g., a rear wall, a mountain, sky, or sea) included in the target image 100 and an object (e.g., the person 120 and the item 140) that does not include the background, using the first information of the reference pattern information, and may identify that the background 110 is behind the person 120 and the item 140 using the second information with respect to the recognized background 110, person 120, and item 140, and may acquire the same as depth information.

The depth information acquirer 222 may acquire depth information on each of a plurality of points of the target image 100 based on the reference pattern information. Here, each of the points may correspond to the aforementioned first portion or second portion. For example, the depth information acquirer 222 may acquire relative z-axial value information with respect to a plurality of portions of the target image 220.

In operation 320, the dynamic effect applier 224 may apply a dynamic effect to at least a portion of the target image 100 based on the depth information acquired in operation 310. For example, the dynamic effect applier 224 may apply the dynamic effect to at least one of the aforementioned first portion or second portion based on the acquired depth information.

The dynamic effect may generate at least one of, for example, a motion effect, a color change effect, or a shape change effect with respect to a portion of the target image 100 to which the dynamic effect is applied. The motion effect may generate, for example, a shake effect, a rotate effect, or a tilt effect, with respect to the portion of the target image 100 to which the dynamic effect is applied.

Applying of the motion effect may be performed by applying, to the specific portion of the target image 100, for example, a rotation operation of rotating a specific portion of the target image 100 based on at least one of an x axis, a y axis, or a z axis, and/or a shifting operation of shifting the specific portion in one direction among up, down, left, and right.

A method of applying a dynamic effect to the target image 100 when depth information is acquired with respect to each of the plurality of points of the target image 100 is described with reference to the following operations 322 and 324. Referring to FIG. 3, operations 322 and 324 may be included in operation 320.

In operation 322, the dynamic effect applier 224 may apply a first dynamic effect to the first portion of the target image 100 based on the depth value acquired in operation 310. For example, the dynamic effect applier 224 may apply the first dynamic effect to a point of which a measured depth value is greater than or equal to a threshold value among the plurality of points. The threshold value may represent a value corresponding to a relative position of a reference object or an element included in the object, as a relative value corresponding to the relative position.

In operation 324, the dynamic effect applier 224 may apply a second dynamic effect to a portion different from the first portion of the target image 100, based on the depth value acquired in operation 310. For example, the dynamic effect applier 224 may apply the second dynamic effect to a point of which a measured depth value is less than the threshold value among the plurality of points.

That is, a different dynamic effect may be applied to each of at least two points among the plurality of points of the target image 100, based on the depth value represented by the depth information acquired for the plurality of points of the target image 100.

The first dynamic effect and the second dynamic effect may generate a motion effect with respect to an object associated with the point of the target image 100 to which the corresponding dynamic effect is applied or an element included in the associated object. When the first dynamic effect is applied, a greater motion effect may be generated with respect to the associated object or the element included in the associated object compared to a case in which the second dynamic effect is applied.

For example, the dynamic effect applier 224 may apply a motion effect that generates a greater shake with respect to a point of which a measured depth value is greater than or equal to a threshold value, and may apply a motion effect that generates a smaller shake with respect to a point of which a measured depth value is less than the threshold value. Accordingly, the target image 100 to which the dynamic effect is applied may exhibit a cubic effect that a front positioned object may less shake and a rear positioned object may further shake.

In some example embodiments, the first dynamic effect may be applied to the background 110. For example, the first dynamic effect may relate to rotating the background 110 or shifting the background 110 based on at least one of the x axis, the y axis, or the z axis. The second dynamic effect may be applied to the things 120 and 140, but not to the background 110. For example, the second dynamic effect may be a filter effect and/or a highlighting effect (highlighting an inside and/or outline).

In operation 330, the dynamic effect applier 224 may generate the target image 100 to which the dynamic effect is applied as dynamic image content. For example, the dynamic effect applier 224 may generate the dynamic image content by synthesizing the target image 100 to which the dynamic effect is not applied and the target image 100 to which the dynamic effect is applied (or a portion to which the dynamic effect is applied in the target image 100).

A depth information acquirement method and a dynamic effect application method for the target image 100 according to an example embodiment are further described with reference to FIGS. 4 to 8.

Description related to technical features described above with reference to FIGS. 1 and 2 may apply to FIG. 3 and further description is omitted.

Figure 4:
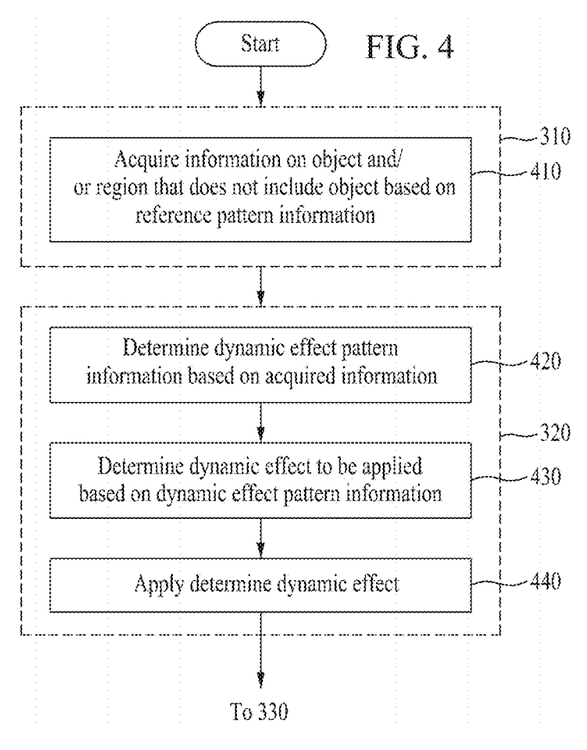
FIG. 4 is a flowchart illustrating a method of determining dynamic effect pattern information and applying, to a target image, a dynamic effect that is determined based on the dynamic effect pattern information according to an example embodiment.

FIG. 4 is a flowchart illustrating a method of determining dynamic effect pattern information and applying, to a target image, a dynamic effect that is determined based on the dynamic effect pattern information according to an example embodiment.

In operation 310 of FIG. 3, the controller 220 (or the depth information acquirer 222 or the dynamic effect applier 224) may acquire information on an object (including an element included in the object) included in the target image 100 and/or a region of the target image 100 that excludes the corresponding object, based on reference pattern information (operation 410). For example, the controller 220 may identify an object that is included in the target image 100 based on the reference pattern information.

Through the following operations 420 to 440, a dynamic effect suitable for the identified object or the region of the target image 100 that does not include the corresponding object may be determined and applied.

In operation 420, the dynamic effect applier 224 may determine dynamic effect pattern information for determining the dynamic effect to be applied to the target image 100 based on information acquired in operation 410. That is, the dynamic effect applier 224 may determine dynamic effect pattern information based on information on at least one of the object included in the target image 100 or the region of the target image 100 that excludes the corresponding object that are identified based on the aforementioned first information and second information included in the pattern information for acquiring depth information. The dynamic effect pattern information may be determined by further considering an input or a selection by the user. For example, when each of or a portion of a plurality of dynamic effects applicable to the corresponding object corresponds to dynamic effect pattern information in association with the identified object of the target image 100, the dynamic effect applier 224 may identify dynamic effect pattern information corresponding to the plurality of dynamic effects and may determine dynamic effect pattern information corresponding to the dynamic effect selected by the user, in response to the selection of the user.

Depending on the object that is included in the target image 100 identified in operation 410, the dynamic effect pattern information may include information on a dynamic effect suitable for the corresponding object. For example, when the object included in the target image 100 identified in operation 410 is the background 110, for example, sky, wall, mountains, or sea, dynamic effect pattern information including information on the suitable dynamic effect to be applied to the background 110 may be determined. When the identified object included in the target image 100 is the face 130, dynamic effect pattern information corresponding to a plurality of facial expressions for applying dynamic effects corresponding to the plurality of facial expressions to the face 130 may be determined. In this case, dynamic effect pattern information corresponding to a single facial expression may be selected by the user.

In operation 430, the dynamic effect applier 224 may determine a dynamic effect to be applied to at least one of the first portion or the second portion of the target image 100 of operation 320, based on the dynamic effect pattern information that is determined in operation 420.

In operation 440, the dynamic effect applier 224 may apply the dynamic effect determined in operation 430 to at least one of the first portion or the second portion of the target image 100. For example, when the dynamic effect pattern information represents applying a left-to-right shake dynamic effect to the background and applying an up-and-down shake effect to a remaining object that does not include the background, the dynamic effect applier 224 may apply a dynamic effect corresponding to the determined dynamic effect pattern information to the background 110 and the objects 120 to 140 of the target image 100.

An example embodiment of applying the dynamic effect application method of operations 420 to 440 to the face 130 included in the target image 100 is further described with reference to FIG. 5.

Description related to technical features described above with reference to FIGS. 1 to 3 may apply to FIG. 4 and further description is omitted.

Figure 5:
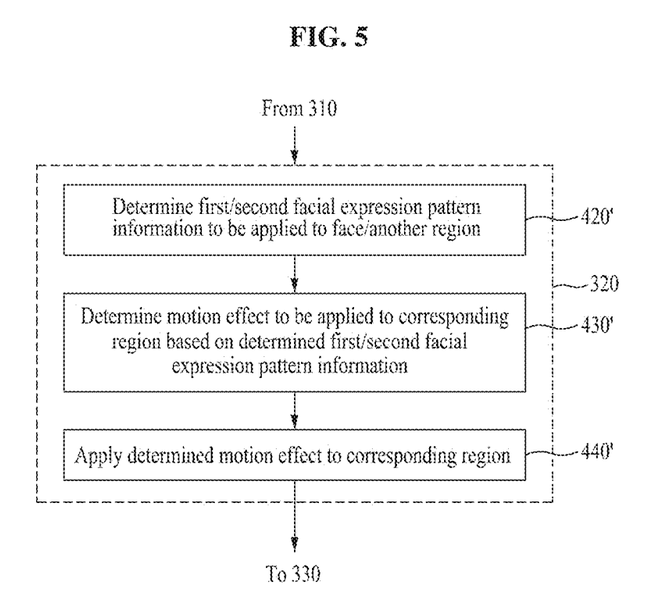
FIG. 5 is a flowchart illustrating a method of determining facial expression pattern information on a face/another region of a target image and applying, to the face/other region of the target image, a motion effect that is determined based on the determined facial expression pattern information according to an example embodiment.

FIG. 5 is a flowchart illustrating a method of determining facial expression pattern information on a face/another region of a target image and applying, to the face/other region of the target image, a motion effect that is determined based on the determined facial expression pattern information according to an example embodiment.

The following operations 420' to 440' may correspond to the aforementioned operations 420 to 440 of FIG. 4, respectively. The dynamic effect pattern information described in operations 420 to 440 may correspond to facial expression pattern information that is described below.

As described above with reference to FIG. 3, first information of pattern information for acquiring depth information may include information for identifying a specific object included in the target image 100 and identifying a shape of at least one element included in the specific object. Also, second information of the pattern information may include information for determining a relative position between at least two elements included in the specific object.

An example in which a specific object is a face of a person and at least one element included in the specific object is an eye, a nose, lips, or an ear as a part included in the face is described with reference to FIG. 5.

In operation 410 of FIG. 4, the face 130 included in the target image 100 and a part of the face are identified based on pattern information.

In operation 420', the dynamic effect applier 224 may determine first/second facial expression pattern information to be applied to the face 130/another region of the target image 100. The dynamic effect applier 224 may determine first facial expression pattern information corresponding to a dynamic effect to be applied to the face 130. The other region may represent a portion of the target image 100 that does not include the face 130 or the entire region of the target image 130. The dynamic effect applier 224 may determine second facial expression pattern information corresponding to a dynamic effect to be applied to the other region.

In operation 430', the dynamic effect applier 224 may determine a motion effect to be applied to a corresponding region based on the determined first/second facial expression pattern information.

In operation 440', the dynamic effect applier 224 may apply the motion effect determined in operation 430' to the corresponding region of the target image 100.

That is, the dynamic effect applier 224 may determine and apply a motion effect to be applied to the face 130 or the part included in the face 130 based on the determined first facial expression pattern information, and may determine and apply a motion effect to be applied to the other region based on the determined second facial expression pattern information.

The first facial expression pattern information may be information on a facial expression applicable to the face 130 identified in operation 410. The first facial expression pattern information may be predefined. For example, the first facial expression pattern information may be a smiling facial expression pattern, an angry facial expression pattern, a blank facial expression pattern, a sad facial expression pattern, or a crying facial expression pattern. The dynamic effect applier 224 may provide the aforementioned facial expression patterns to the user and may determine a facial expression pattern selected by the user as the first facial expression pattern information corresponding to the motion effect to be applied to the face 130.

The dynamic effect applier 224 may apply the motion effect to the face 130 by changing a size, a shape, and a color of at least one of eyes, nose, lips, or ears of the face 130 based on the determined first facial expression pattern information.

The second facial expression pattern information may be information on a dynamic effect applicable to the portion of the target image 100 that does not include the face 130 identified in operation 130 or the entire (i.e., the aforementioned other region) target image 100. The second facial expression pattern information may be predefined. For example, the second facial expression pattern information may be a smiling facial expression pattern, an angry facial expression pattern, a blank facial expression pattern, a sad facial expression pattern, or a crying facial expression pattern. The dynamic effect applier 224 may provide the aforementioned facial expression patterns to the user, and may determine a facial expression pattern selected by the user as the second facial expression pattern information corresponding to the motion effect to be applied to the other region. In some example embodiments, the first facial expression pattern may be selected by the user and the second facial expression pattern information may be automatically determined.

Applying of the motion effect based on the second facial expression pattern information may relate to, for example, rotating or shifting the other region based on a reference position of the target image 100 during a desired (or alternatively, predetermined) period of time. For example, the smiling facial expression pattern may represent generating a tilt effect or a rotate effect in a up-and-down (y-axial) direction or a left-and-right (x-axial) direction with respect to the other region, and the angry facial expression pattern may represent generating a shake effect in the up-and-down or left-and-right direction with respect to the entire target image 100. The blank facial expression pattern may represent generating the tilt effect or the rotate effect alternatively in up, down, left, and right directions with respect to the other region.

Description related to technical features described above with reference to FIGS. 1 to 4 may apply to FIG. 5 and further description is omitted.

Figure 6:
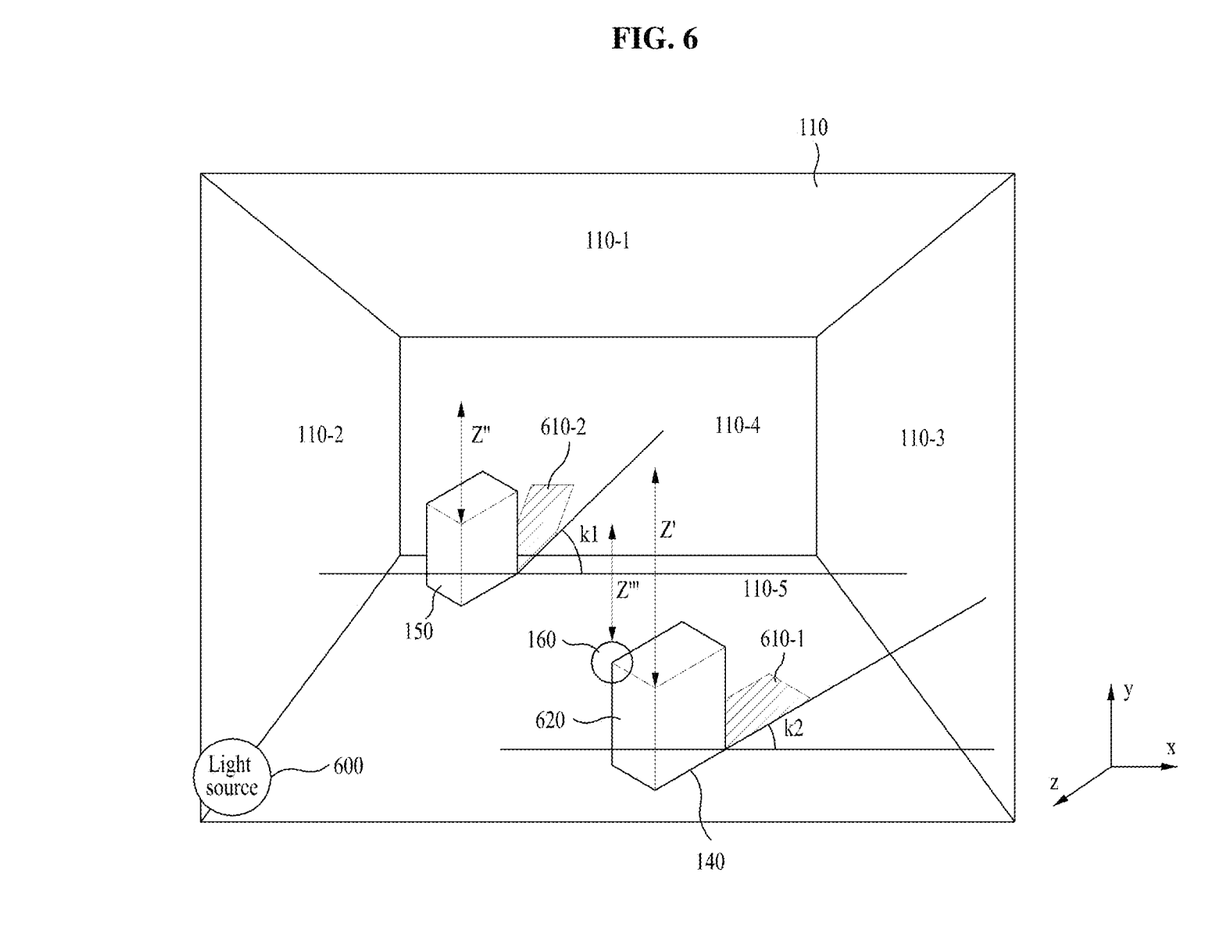
FIG. 6 illustrates a method of acquiring depth information on a corresponding object using an outline and/or shadow of the object with respect to the object included in an image according to an example embodiment.

FIG. 6 illustrates a method of acquiring depth information on a corresponding object using an outline and/or shadow of the object with respect to the object included in an image according to an example embodiment.

A method of acquiring depth information on the target image 100 based on reference pattern information described through operation 310 of FIG. 3 is further described with reference to FIG. 6.

The aforementioned first information included in reference pattern information used to acquire depth information may include information for identifying (or alternatively, information on) a shadow of a specific object included in the target image 100 or information for identifying (or alternatively, information on) an outline of the specific object. Further, the aforementioned second information included in the pattern information may include information for determining (or alternatively, information on) a relative position between the specific object and another object included in the target image 100 as depth information (1) based on at least one of a direction, a shape, or a size of the shadow or (2) based on a relationship between the outline of the specific object and another outline of another object.

1-1. A method of acquiring depth information on a specific object by identifying a shadow of the specific object included in the target image 100 based on first information of reference pattern information and by determining a relative position between the specific object and another object based on second information of the reference pattern information is described.

The depth information acquirer 222 may identify a first shadow 610-1 of a first item 140 and a second shadow 610-2 of a second item 150 based on the first information of the reference pattern information. The depth information acquirer 222 may determine a relative position between the first item 140 and the second item 150 by comparing shapes and/or sizes of the identified first shadow 610-1 and second shadow 610-2 based on the second information of the reference pattern information. For example, 1) the depth information acquirer 222 may identify an item corresponding to a relatively large shadow between the first shadow 610-1 and the second shadow 610-2 as an item that is positioned at relatively front. Alternatively, 2) the depth information acquirer 222 may identify an item corresponding to a shadow partially overlapping a rear wall 110-4 as an item that is positioned at relatively rear by comparing shapes of the first shadow 610-1 and the second shadow 610-2. In some example embodiments, the depth information acquirer 222 may determine a relative position between items by combining 1) and 2). In the example of FIG. 6, the first item 140 is determined to be positioned ahead of the second item 150. That is, a depth value z' is determined to be greater than a depth value z" based on the rear wall 110-4.

1-2. Hereinafter, another method of acquiring depth information on a specific object by identifying a shadow of the specific object included in the target image 100 based on first information of reference pattern information and by determining a relative position between the specific object and another object based on second information of the reference pattern information is described.

The depth information acquirer 222 may determine an angle k2 between the identified first shadow 610-1 and a reference line (for example, a horizontal line) of the target image 100 and an angle k1 between the second shadow 610-2 and the reference line of the target image 100 and may compare the angles k1 and k2. The depth information acquirer 222 may determine that an object (the item 150 in the illustrated example) corresponding to a shadow having a relatively great angle is an item that is positioned at relatively rear (based on the second information included in the reference pattern information). That is, in the illustrated example, the depth value z' may be determined to be greater than the depth value z" based on the wall 110-4.

In the methods of 1-1 and 1-2, the depth information acquirer 222 may determine a direction or a position of a light source 600 prior to acquiring depth information on items. Here, the direction of the light source 600 refers to a direction along which the light source 600 emits light. The position of the light source may be determined based on directions of the identified first shadow 610-1 and second shadow 610-2. For example, the depth information acquirer 222 may determine the direction of the light source 600 (not the reference line forming the angle k1 or k2) based on the angle k1 or k2 formed between the shadow 610-1 or 610-2 and the reference line, for example, the horizontal line, of the target image 100. Also, the depth information acquirer 222 may determine a position at which a straight line excluding the reference line forming the angle k1 and a straight line excluding the reference line forming the angle k2 meet as the position of the light source 600. The light source 600 may be included in or may not be included in the target image 100.

Based on the determined direction or position of the light source 600, the depth information acquirer 222 may determine depths of the items 140 and 150 in a different manner. For example, although not illustrated, when the light source 600 is determined to be positioned at a right lower end of the rear wall 110-4, the depth information acquirer 222 may determine that an item having a relatively large shadow is positioned at relatively rear in the method of 1-1. Also, the depth information acquirer 222 may determine that an item having a relatively great angle between a shadow and a reference line is positioned at relatively front in the method of 1-2.

That is, the depth information acquirer 222 may acquire depth information on objects included in the target image 100 by collectively considering a change in a shape, a size, and a direction of a shadow based on the determined position or direction of the light source 600.

Any technique for recognizing a shadow in an image may be applicable to a method of identifying, by the depth information acquirer 222, a shape and a size of a shadow and accordingly, further description is omitted. For example, the depth information acquirer 222 may identify a shadow of an object included in the target image 100 by identifying a black region that hangs in a desired (or alternatively, predetermined) direction in the target image 100.

2. Hereinafter, a method of acquiring depth information on a specific object by identifying an outline of the specific object included in the target image 100 and an outline of another object based on first information of reference pattern information and by determining a relative position between the specific object and the other object based on second information of the reference pattern information is described.

The depth information acquirer 222 may identify an outline 620 of the first item 140 and an outline of a third item 160 based on first information of reference pattern information. Here, an outline of an object may indicate an outer boundary portion that includes a corner and a circumference of the object.

For example, the depth information acquirer 222 may identify shapes of the first item 140 and the third item 160 by verifying the outline 620 of the first item 140 and the outline of the third item 160, respectively. The depth information acquirer 222 may identify that at least a portion of the outline of the third item 160 verified in a spherical shape is occluded by the first item 140 based on second information of the reference pattern information, and may determine that the third item 160 is positioned behind the first item 140. That is, the depth value z' is determined to be greater than the depth value z'" based on the rear wall 110-4.

Any technique for identifying an object in an image may be applicable to a method of identifying, by the depth information acquirer 222, an outline of an object. Accordingly, further description is omitted.

The depth information acquirer 222 may determine a relative position among the items 140 to 160 by combining the aforementioned methods of 1-1 or 1-2 and 2.

In the meantime, the depth information acquirer 222 may identify elements (ceiling 110-1, left wall 110-2, right wall 110-3, rear wall 110-4, and floor 110-5) constituting the background 110, and may determine that the rear wall 110-4 is positioned at the rearmost among objects included in the target image 100.

The dynamic effect applier 224 may apply a dynamic effect to the target image 100 based on the depth information on the target image 100 acquired using the aforementioned method.

Description related to technical features described above with reference to FIGS. 1 to 5 may apply to FIG. 6 and further description is omitted.

Figure 7:
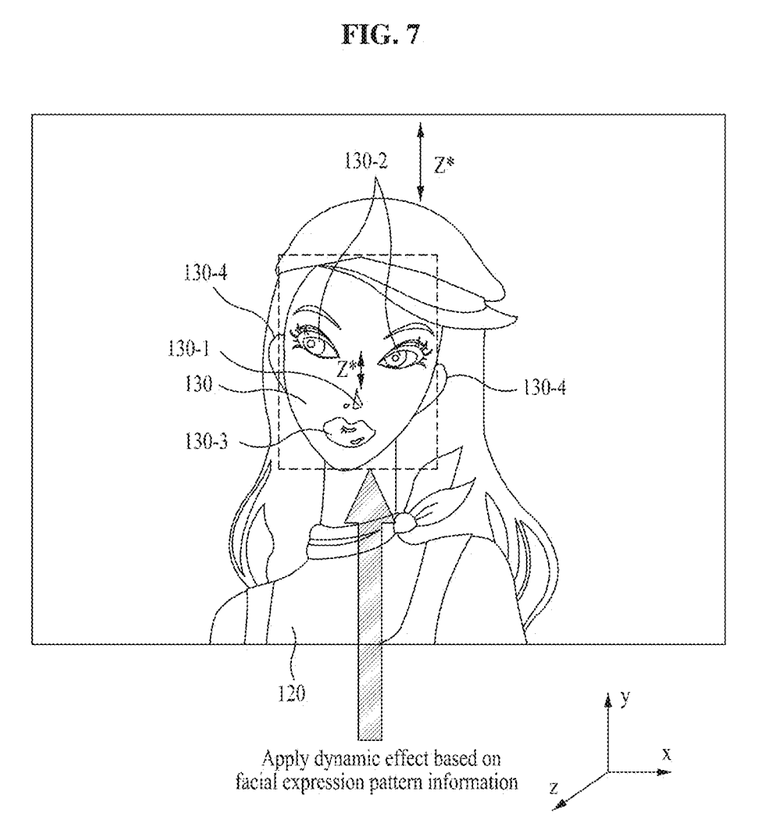
FIG. 7 illustrates a method of identifying a face included in an image, acquiring depth information on a part included in the face, and applying a dynamic effect to the face according to an example embodiment.

FIG. 7 illustrates a method of identifying a face included in an image, acquiring depth information on a part included in the face, and applying a dynamic effect to the face according to an example embodiment.

The method of applying a dynamic effect to a face described above with reference to FIG. 5 is further described with reference to FIG. 7.

The depth information acquirer 222 may acquire depth information (corresponding to z) representing that the body 120 and the face 130 are in front of the background 110, based on the reference pattern information. Further, the depth information acquirer 222 may identify elements 130-1 to 130-4 included in the face 130** based on the reference pattern information and may acquire depth information (corresponding to z*) of other elements based on a specific element 130-1.

For example, in the illustrated example, the depth information acquirer 222 may identify eyes 130-2, nose 130-1, lips 130-3, and ears 130-4 based on the first information and the second information of the reference pattern information and may identify that the face 130 faces the front. Here, the nose 130-1 may be verified to be at the foremost. The depth information acquirer 222 may determine the remaining elements 130-2 to 130-4 are behind the nose 130-1.

The dynamic effect applier 224 may determine dynamic effect pattern information corresponding to a dynamic effect to be applied to the face based on the elements 130-1 to 130-4 of the face 130 acquired using the aforementioned method. The dynamic effect applier 224 may provide the user with a plurality of facial expressions (facial expression pattern information) as dynamic effect pattern information corresponding to the dynamic effect to be applied to the face, and may apply a dynamic effect corresponding to facial expression pattern information selected by the user to the target image 100 including the face 130.

For example, when facial expression pattern information representing an angry facial expression is selected, the dynamic effect applier 224 may change a shape of the eye 130-2 to appear sharp-sighted or a color of the eye 130-2 to be reddish, and may apply a shake effect to a portion of the target image 100 that does not include the face 130 or the entire target image 100.

By applying the dynamic effect in the aforementioned manner, the user may recognize the target image 100 as dynamic content similar to a video.

Description related to technical features described above with reference to FIGS. 1 to 6 may apply to FIG. 7 and further description is omitted.

Figure 8:
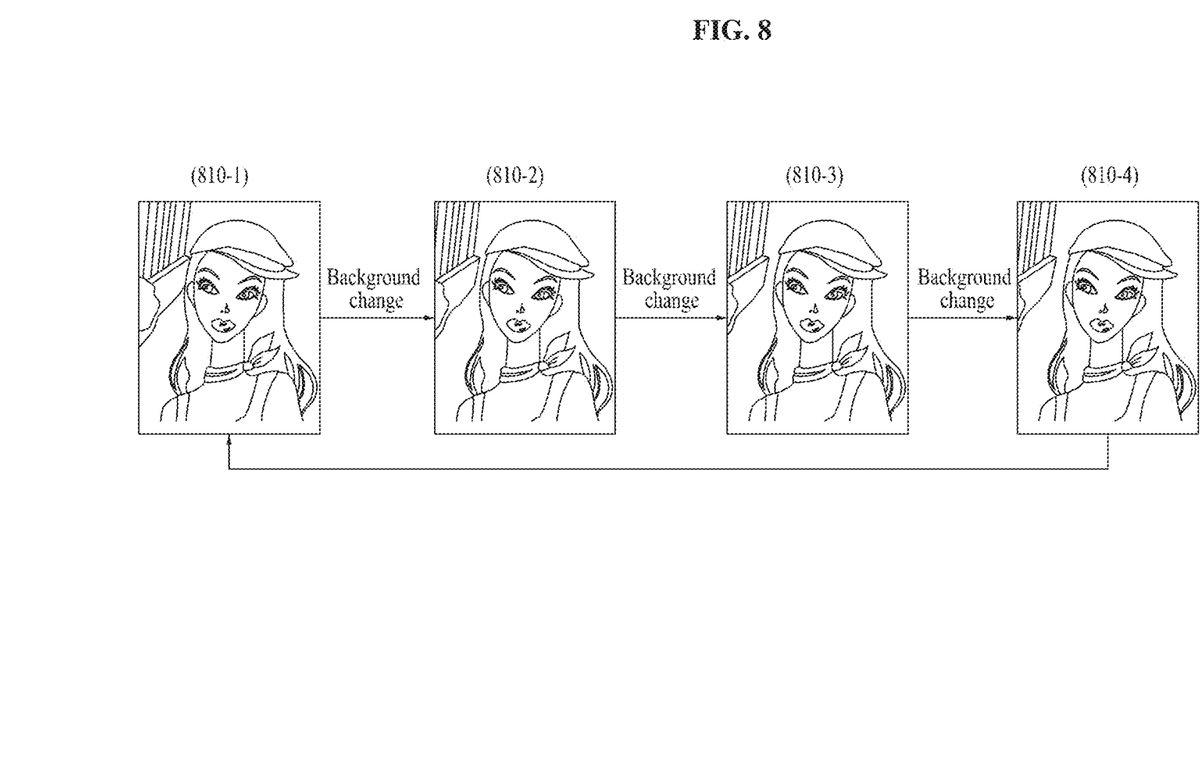
FIG. 8 illustrates a method of applying a dynamic effect to a background as an object included in an image according to an example embodiment.

FIG. 8 illustrates a method of applying a dynamic effect to a background as an object included in an image according to an example embodiment.

Hereinafter, a method of applying a dynamic effect to the target image 100 is described with reference to FIG. 8.

The dynamic effect applier 224 may generate dynamic image content recognizable to be similar to a video by the user by synthesizing target images 810-1 to 810-4 each to which a dynamic effect is applied.

In some example embodiments, the dynamic effect applier 224 may apply a background changing dynamic effect (tilt, rotate, or shift) to a portion corresponding to a background as shown in first to fourth target images 810-1 to 810-4, may synthesize the first to fourth target images 810-1 to 810-4, and may generate dynamic image content configured to repeatedly regenerate the applied dynamic effect. For example, each of the first to fourth target images 810-1 to 810-4 may be processed as a frame.

In the illustrated example, only a case in which a dynamic effect is applied only to a portion corresponding to a background is described. However, as described above, the dynamic effect may be similarly applied to a portion of the target image that does not include the background.

The apparatuses described herein may be implemented using hardware or a combination of software and hardware. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or at least one combination thereof, for independently or collectively instructing or configuring the processing device to operate as desired. Software and/or data may be embodied permanently or temporarily in any type of machine, component, physical equipment, virtual equipment, computer storage medium or device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable storage media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable storage media include magnetic media such as hard disks, floppy disks, and magnetic tapes, optical media such as CD-ROM discs, and DVDs, magneto-optical media such as floptical disks, and hardware devices that are specially configured to store and perform program instructions, such as read-only memory (ROM), random access memory (RAM), flash memory, and the like. The media may be various recording devices or storage devices in which a single piece or a plurality of pieces of hardware are combined and may be present on a network without being limited to a medium directly connected to a computer system. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An image processing method comprising:
acquiring depth information on at least one of a first portion of a specific object included in a target image or a second portion in a region of the target image that excludes the specific object based on reference pattern information, the reference pattern information including first information on a shape of an object included in an image and second information on a relative position between at least two objects included in the image; and
applying a dynamic effect to at least one of the first portion or the second portion based on the acquired depth information,
wherein the first information comprises shape information on a shadow of the specific object included in the target image or information for identifying an outline of the specific object, and
the second information comprises depth information on the relative position between the specific object and another object, which are included in the target image, (1) based on at least one of a direction, a shape, or a size of the shadow or (2) based on a relationship between the outline of the specific object and another outline of the another object.

2. The image processing method of claim 1, wherein
the acquiring depth information comprises acquiring the depth information on each of a plurality of points of the target image, each of the points corresponding to the first portion or the second portion, and
the applying a dynamic effect comprises applying a different dynamic effect to each of at least two points among the points based on a depth value represented by the depth information acquired for a corresponding one of the at least two points.

3. The image processing method of claim 2, wherein the applying a dynamic effect comprises:
applying a first dynamic effect to one of the at least two points that has a first depth value greater than or equal to a threshold value; and
applying a second dynamic effect to another of the at least two points that has a second depth value less than the threshold value.

4. The image processing method of claim 3, wherein the first dynamic effect and the second dynamic effect each are a motion effect with respect to the specific object or an element included in the specific object, which is associated with the one of the at least two point, the first dynamic effect being greater than the second dynamic effect.

5. The image processing method of claim 1, wherein the specific object included in the target image is a background, a first thing constituting the background, or a second thing that does not include the background in the target image.

6. The image processing method of claim 1, wherein the depth information represents a relative depth value based on the specific object included in the target image or an element included in the specific object with respect to a specific reference position.

7. The image processing method of claim 1, wherein the dynamic effect includes at least one of a motion effect, a color change effect, or a shape change effect with respect to a portion of the target image to which the dynamic effect is applied.

8. The image processing method of claim 7, wherein the motion effect includes at least one of a shake effect, a rotate effect, or a tilt effect with respect to the portion of the target image to which the dynamic effect is applied.

9. The image processing method of claim 1, wherein the applying a dynamic effect comprises:
    determining the dynamic effect to be applied to at least one of the first portion or the second portion based on reference dynamic effect pattern information; and
    applying the determined dynamic effect to at least one of the first portion or the second portion.

10. The image processing method of claim 9, wherein the applying a dynamic effect further comprises determining the reference dynamic effect pattern information based on information on at least one of (1) the specific object included in the target image or (2) the region of the target image that does not include the specific object that are identified based on the first information and second information.

11. The image processing method of claim 1, wherein the first information comprises information about at least one of the specific object included in the target image or information on a shape of at least one element included in the specific object.

12. An image processing method comprising:
    acquiring depth information on at least one of a first portion of a specific object included in a target image or a second portion in a region of the target image that excludes the specific object based on reference pattern information, the reference pattern information including first information on a shape of an object included in an image and second information on a relative position between at least two objects included in the image; and
    applying a dynamic effect to at least one of the first portion or the second portion based on the acquired depth information,
    wherein the specific object is a face of a person, and the at least one element included in the specific object is an eye, a nose, lips, or an ear included in the face.

13. The image processing method of claim 12, wherein the applying a dynamic effect comprises:
    determining first facial expression pattern information corresponding to the dynamic effect to be applied to the face or the at least one element included in the face; and
    applying a motion effect to the face or the at least one element included in the face based on the determined first facial expression pattern information.

14. The image processing method of claim 12, wherein the applying a dynamic effect comprises:
    determining second facial expression pattern information corresponding to the dynamic effect to be applied to a portion of the target image that excludes the face or to an entirety of the target image; and
    applying a motion effect to the portion of the target image that excludes the face or the entirety of the target image based on the determined second facial expression pattern information.

15. A non-transitory computer-readable record medium storing a program, when executed by one or more processors, causes the one or more processors to perform the method according to claim 1.

16. An image processing apparatus comprising:
    a memory configured to store computer-readable instructions; and
    one or more processors configured to execute the computer-readable instructions such that the one or more processors are configured to,
    acquire depth information on at least one of a first portion of a specific object included in a target image or a second portion in a region of the target image that excludes the specific object in based on reference pattern information, the reference pattern information including first information on a shape of an object included in an image and second information on a relative position between at least two objects included in the image, and
    apply a dynamic effect to at least one of the first portion or the second portion based on the acquired depth information,
    wherein the first information comprises shape information on a shadow of the specific object included in the target image or information for identifying an outline of the specific object, and
    the second information comprises depth information on the relative position between the specific object and another object, which are included in the target image, (1) based on at least one of a direction, a shape, or a size of the shadow or (2) based on a relationship between the outline of the specific object and another outline of the another object.

17. The image processing apparatus of claim 16, further comprising:
    a first database configured to store the reference pattern information,
    wherein the one or more processors are configured to acquire the reference pattern information from the first database.

18. The image processing apparatus of claim 16, wherein the one or more processors are further configured to,
    determine the dynamic effect to be applied to at least one of the first portion or the second portion based on reference dynamic effect pattern information, and
    apply the determined dynamic effect to at least one of the first portion or the second portion.

19. The image processing apparatus of claim 18, further comprising:
    a second database configured to store the reference dynamic effect pattern information,
    wherein the one or more processors are configured to acquire the reference dynamic effect pattern information from the second database.

* * * * *